Sept. 25, 1962 G. R. STACK 3,055,437
MOISTURE PROOF HELICOPTER BLADE
Filed Oct. 15, 1957 2 Sheets-Sheet 1
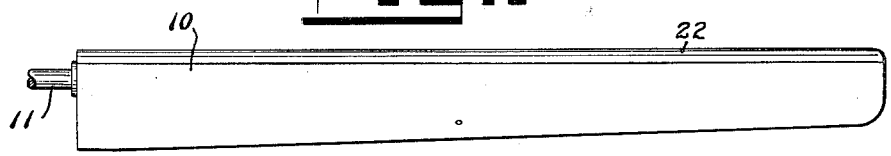
Fig. 1
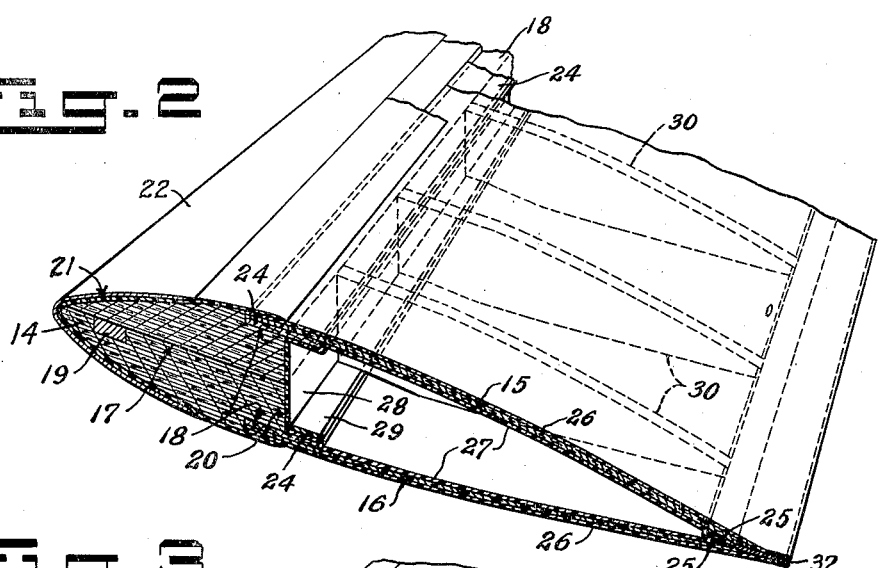
Fig. 2
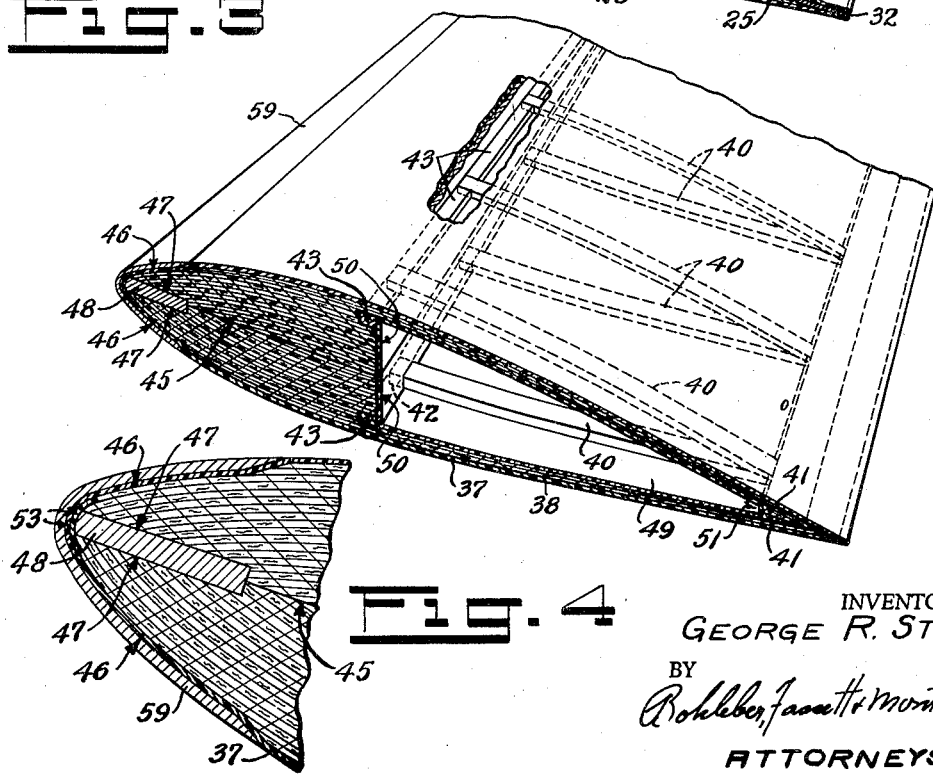
Fig. 3
Fig. 4
INVENTOR.
GEORGE R. STACK
BY
ATTORNEYS

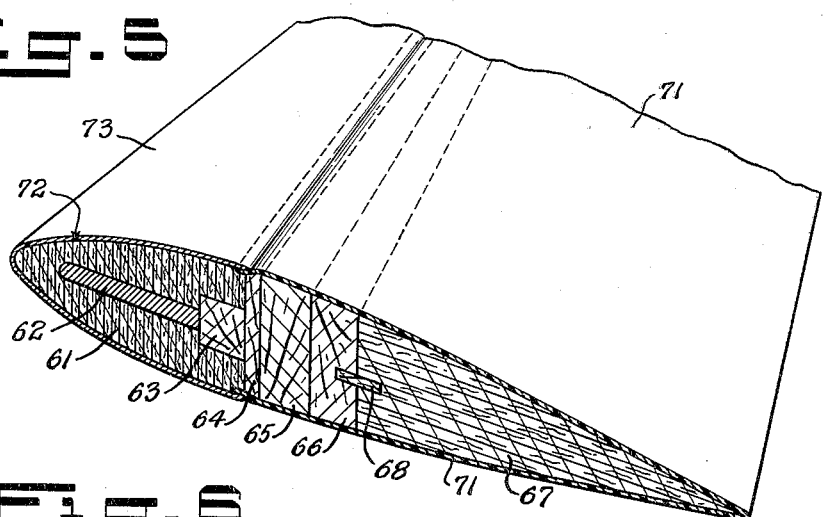
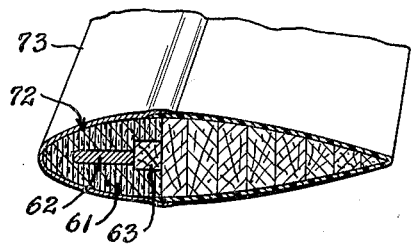
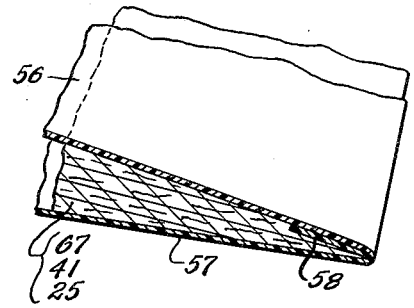
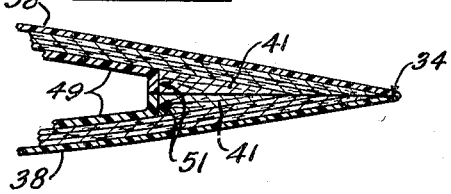
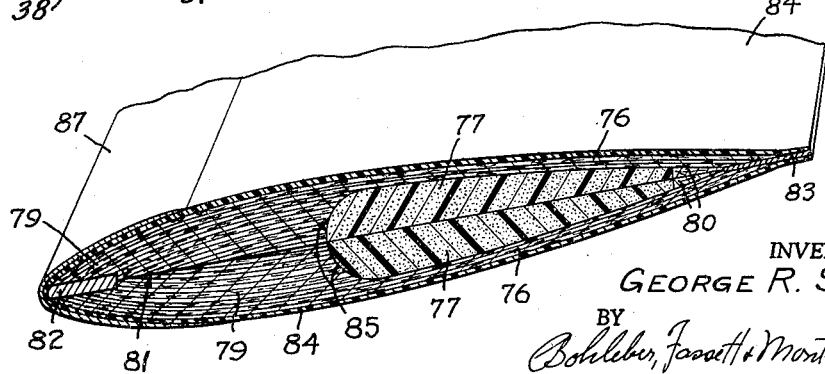

United States Patent Office 3,055,437
Patented Sept. 25, 1962

3,055,437
MOISTURE PROOF HELICOPTER BLADE
George R. Stack, Danbury, Conn., assignor to Doman Helicopters, Inc., Danbury, Conn., a corporation of Delaware
Filed Oct. 15, 1957, Ser. No. 690,307
17 Claims. (Cl. 170—159)

The invention relates to rotor blades for rotors of helicopters made of moisture absorbing material such as wood, reinforced plastic and the like, for the main rotor as well as for the tail rotor. The invention also relates to methods of making rotor blades using moisture absorbing materials and particularly to methods by which the blades are made moistureproof. Because of the moisture absorption problems of non-metallic blades, some manufacturers use metal blades. These blades have many disadvantages, the principal ones being that they are undesirably stiffer, more expensive in many respects, and are more susceptible to fatigue failure due to scars, scratches and abrasion even of a minor nature.

A helicopter blade made of a non-metallic material has many advantages, however, moisture absorption and drying out has presented a problem. Non-metallic materials used for blades will absorb moisture and because it is absorbed unevenly, it frequently introduces undesirable centrifugal unbalance in a helicopter blade and rotor and this results in vibration which is not only troublesome but may be destructive to the entire aircraft. Wooden blades as presently made have been painted or covered with other material yet these do not adequately solve the problem of moisture absorption. These covering materials in addition require final finishing which adds to the cost of manufacture. Also pain deteriorates rapidly which necessitates frequent refinishing of the blades. Furthermore with the construction and method of construction herein the time consumed in finishing a blade with the usual five coats of paint is dispensed with, which results in a saving of about twenty-five man hours.

Some helicopter blades are hollow and in order to equalize pressure inside and outside of the blade, it is customary to provide one or more holes into the inner cavity for pressure equalization purposes. This means that moisture is frequently absorbed into the wood from the cavity and thus further enlarges the moisture absorption problem with hollow blades made of moisture absorbing material.

It is an object of the invention to construct a rotor blade of moisture absorbing material which is effectively moisture sealed.

It is another object of the invention to construct a hollow rotor blade of moisture absorbing material in which both internal and external surfaces are effectively moisture sealed.

It is another object of the invention to provide a method for moisture sealing a helicopter blade made of moisture absorbing material.

A still further object is to provide a method for making a hollow rotor blade made of moisture absorbing material which is internally and externally moisture sealed.

Again, it is an object to provide a construction of blade of moisture absorbing material and a method of making the same which saves considerably in the cost of manufacture.

Another object is to provide a method for moisture sealing an existing blade made of moisture absorbing material.

Other objects of the invention will be more apparent from the following description when taken in connection with the accompanying drawings illustrating preferred constructions in which:

FIG. 1 is a plan view of a helicopter blade;
FIG. 2 is a sectional and partial perspective view of a hollow rotor blade for the main rotor and illustrating the moisture proofing of the exterior and interior surfaces of the blade;
FIG. 3 is a sectional and partial perspective view of another form of hollow rotor blade which is moisture proofed or sealed on the inner and exterior surfaces;
FIG. 4 is an enlarged view of the leading edge or nose of the blade of FIG. 3;
FIG. 5 is a sectional and partial perspective view of a solid rotor blade which has been moisture proofed or sealed on its exterior surfaces;
FIG. 6 is a sectional and partial perspective view of a solid rotor blade with another form and method of film attachment;
FIG. 7 is an enlarged view of the trailing edge of a solid blade illustrating another form of attachment of a moisture sealing film;
FIG. 8 is an enlarged sectional view of the trailing edge of a blade, and
FIG. 9 is a sectional view of another construction of blade.

The construction of rotor blades of different types will be described in conjunction with their method of manufacture. A rotor blade in general includes an airfoil or aerodynamic portion 10 which may be attached to a rotor head by connecting means such as by hinges or a connecting spar 11 which connecting means is attached at one end of the airfoil portion in any manner and secured or attached at the other end to the rotor head. The airfoil portion of the blade shown in FIG. 2 includes a spar 14 and an upper and lower "skin" 15 and 16 respectively extending rearwardly from the upper and lower surfaces of the spar and joined or bonded together at their trailing edges. The hollow portion or cavity of the blade lies between the spaced skins.

The spar is built up on a flat mandrel to form a long laminated plank of desired size in two steps or stages to form approximately equal half sections or to about a mid plane 17. Preferably one section is made thicker than the other so that a slug groove need be routed into one spar section only. Wooden, fiber glass or similar laminations are laid on the flat mandrel, stapled into position, and bonded together with a suitable bonding agent or adhesive. Each built up spar section is then cooked, as will be described. After cooking, each spar section is routed and sanded where desired and particularly along the mid plane or faying surface. The balance slug groove is routed into the thicker section and the balance slug 19 is inserted therein after which the two spar sections are bonded together with a suitable adhesive using heat and pressure for an appropriate curing time. Thereafter the trailing edge face 20 of any desirable configuration is established and a gluing strip recess 18 is provided or cut out in the top surface of the upper section and the bottom surface of the lower section at the trailing edge of each section. The leading edge or nose of the spar and extending well around the top and bottom surfaces may have a curved recess or depression 21 in the event that it is desired to have a leading edge abrasion strip 22, such as of metal, plastic, rubber or any other suitable material, attached to the blade.

For a fabricated spar having laminations or piles which are parallel with the chord line and hence the mid plane 17, the cooking or curing will vary considerably depending upon the laminate material used, the number of plies, thickness of plies and type of adhesive used. As an example, the cooking may be performed for about 1½ hours at a pressure of 60 pounds per square inch and at a temperature of about 310° Fahrenheit. After cooking, the cooling will be for about 15 minutes for a conversion period and then for about 1½ hours using cold water.

The skins 15 and 16 are made for both the top surface and the bottom surface of the blade by laying laminates or plies together of wood, fiber glass, or the like, on a flat mandrel and stapled. Suitable adhesive is used between laminations. For wood ply laminates, the grain runs 45° to the span. A leading edge gluing strip 24 is bonded or adhesively attached to the inner surface of the leading or spar edge of each skin and a gluing strip 25 is bonded to or adjacent to the trailing edge. This assembly is then cooked in an autoclave in the same manner as the spar with a variation in time, heat and pressure. For example, the skins may be cooked for 30 minutes at 280° Fahrenheit under 40 pounds pressure. This schedule may vary, depending on the number of plies, type of wood, thickness of ply and type of adhesive.

One method of cooking is to insert each spar or spar section, while on the mandrel into a pressure bag such as of neoprene so that when pressure is applied a uniform pressure over the surface is assured. Each skin and its mandrel is inserted into a bag, a vacuum pulled to collapse the bag and remove inside air, and cooked in the same autoclave, if temperatures and pressures should be the same, or a different autoclave for different conditions. The heat and pressure is applied by steam. After cooking, cold water is fed to the autoclave so as to cool the cooked part or parts and gradually reduce the pressure. This conversion period takes about 15 minutes. The assembly is then cooled for a time approximately equal to the cooking time whatever that may have been.

After the skin is constructed, it is cut to the exact final shape. Adhesive is then applied to both the outside and inside surfaces. A moisture sealing film with the adhesion surface chemically treated for bonding, is then applied to both surfaces of the skins 5 to 10 mils on the outside and 3 mils on the inside. The 3 mil film 27 also covers so much of the leading edge gluing strip as will not be bonded to the spar, and also the forward edge of the trailing edge glue strip. The film on the leading edge gluing strip may be wider than necessary and removed by sanding to the position of the spar edge. The thicker film on the outside is applied with excess material hanging over all skin edges. After the film is bonded to the skin the excess film is trimmed off, except that on the outer surface along the trailing edge, which is left for heat-sealing or bonding to the trailing edge tab 32, on assembly.

One of the skins with its leading edge gluing strip is then assembled on the spar with adhesive and about half of the gluing strip being received in the gluing strip recess of the spar. A film of three mils thickness is adhesively attached to the trailing or rear face 20 of the spar so that it has a portion 29 overlapping at least a portion of the film 27 on the gluing strip throughout its length. The overlapping portions of the film are then heat-sealed or welded together by the application of heat at a welding temperature in the neighborhood of 500° Fahrenheit, for a few seconds. The exposed faces of the ribs 30 may be covered with the same film or they may be sprayed or painted with moisture proof material in liquid form; however, it is preferable to use a preformed film in order to assure uniformity in thickness to preserve weight balance of the blade. A strip of the film is removed corresponding to the thickness of each rib from all surfaces to which the rib is to be adhesively attached. This will be the inner surface of both skins extending from the point of contact of the rib with each skin to the trailing edge gluing strip, from the surface of each leading edge gluing strip contacted by the rib, from the trailing or rear face of the spar where a rib is to be placed and from the forward edge of each trailing edge gluing strip. This strip of film may be removed such as by sanding so as to provide a wood to wood bond between each rib and the skins, the gluing strips and the spar. The second skin is then bonded to the spar in a similar manner and the trailing edge glue strips are bonded together.

The blade, especially for the main rotor, has a trailing edge trim tab for correcting chordwise pitching moments. This trim tab 32 of trifluorochloroethylene of about 50 mils thickness, is bonded to the trailing edge between the two skins and with a projecting portion extending preferably the full length of the blade. The skin film on the outer surfaces of both skins overlaps the tab and is heat bonded or welded thereto. In order to assure surfaces which can be heat-sealed together, the chemically treated inner bonding surface of the film may be removed by sanding.

After the trailing edge is assembled, the leading edge contour of the blade previously described is achieved by routing and checking the contour with the use of templates. The adhesive is applied over the spar surface and the spar film is then folded or wrapped around the spar with the edges overlapping the skin film. The overlapping edges may be heat-sealed or if chemically treated are adhesively bonded together. The abrasion strip is then attached.

The film used are of trifluorochloroethylene, sold as "Kel-F" fluorocarbon plastic, which are then adhesively attached and bonded to the forward surface of the spar so that the film edges overlap each film on both skins. There are various grades of this film material. Ordinarily the film will not bond to wood or anything else using known adhesives, however, by chemically treating the surface of the film which is to be bonded to the wood, an adhering surface is secured. One such treatment is by use of metallic sodium dissolved in liquid anyhydrous ammonia. A suitable bonding or adhesive agent for the film is a flexible epoxy resin.

A construction of molded blade is shown in FIGURE 3, which is suitable for production. It is especially for tail rotor blades, although the main rotor blade may be so constructed. In making this blade, a film 37 of trifluorochloroethylene of five to ten mils thickness is laid into the contour of a female mold. Three of four layers, laminations or plies of wood, fiber glass and the like, are laid on top of the film with adhesive between each lamination and between the film and the adjacent lamination. For wood plies the grain is laid at 45° to the span. The first three or four plies that make up the skin are placed into the mold with excess material along the edges. The skin laminations which form the trailing portion of the blade extend over and form a part of the outer layers of the spar laminations as well as forming a skin 38. That is each skin is attached to the spar by being integral with the outer laminations of the spar. The next step is to place in position enough laminations or layers of material to make up the trailing edge gluing strip 41. These layers are coated with adhesive stapled in position. The staples are applied in an area of excess material that will later be removed. Additional plies with the grain parallel to the spar, are added to the spar area to a height equal to the thickness of the stiffeners 40. The stiffeners are then positioned in the mold with adhesive between the contacting surfaces. This assembly is then cooked in the autoclave for 40 minutes at 280° Fahrenheit under 40 pounds pressure in the same manner previously described and cooled.

After the first cooking, filler blocks 43 are installed between the stiffeners using adhesive between all contacting surfaces, and the remaining layers of spar material beyond a mid plane 45 are laid into position over the filler blocks to the rear edge thereof so that the leading end of each stiffener is locked or embedded in place. The assembly is then placed into the autoclave for a second cooking, which is accomplished under the same conditions as the first.

After cooking, the blade is laid in a trimming fixture and the excess material is routed away and down to the mid plane 45 which is a center plane in this blade. An abrasion strip recess 46 can be incorporated in the mold or the recess can be routed out after laminating. After the necessary trimming is complete, a film 49, 3 mils thick is then adhesively attached to the trailing face 50 of each spar section, over the inner surface of the skin and over the stiffeners and along the forward or leading face 51 of the trailing edge glue strip. This blade half is reinstalled into the mold and cooked again to securely bond the film to the interior surfaces. In the cooking process, the pressure on the neoprene bag or other means effectively presses and spreads the inner film around the braces or stiffeners, over the inner surface of the skin, the end face 50 of the spar and the forward face of the gluing strip, and bonds the film thereto. The other half of the blade is made in a similar manner in an opposite mold.

In the process of trimming each half blade, a good bonding surface between the spar halves and the two gluing strips at the trailing edge must be realized. This would leave a projecting portion of the outer film (FIG. 8) at the extreme trailing edge of the blade halves. The blade is then installed in a fixture for the routing of the balance slug recess 47. The lead balance slug 48 is then installed by nailing in a direction parallel with the chord line. The two halves are then adhesively bonded together at the mid plane and also at the gluing strips at the trailing edge of the blade and the trailing edges of the skin. The bonding is accomplished with a suitable cement or bonding agent and with heat and pressure. Thereafter, the two outer films are heat-sealed together at the leading and trailing edges to form a moisture tight seal therebetween throughout the entire exterior edge of the blade. An abrasion strip 59 may then be secured over the leading edge or nose of the completed blade.

The blade half sections may also be manufactured as described above without the outer layer of film. The assembled blade may then be coated with adhesive and a single film folded around the trailing edge and laid over the upper and lower surfaces of the blade. The film edges at the leading edge may have edges 53 of film which overlap each other. These overlapping film edges are then heat-sealed together to form a moisture tight bond. It is clear too that one film 57 (FIG. 7) may be laid with adhesive over one surface such as the lower surface with an overlapping edge 58 at the trailing edge which is folded around the trailing edge to be overlapped by the film on the upper surface. The film 56 on the other surface is then adhesively applied and overlaps the edge 58 and the overlap portions welded or bonded together to seal the same. An abrasion strip 59 may then be attached over the leading edge or nose of the finished blades.

A solid moisture tight or sealed blade may be made as shown in FIGS. 5 to 7. A spar 61 is built up of laminations and routed out for a balancing core 62 and a filler block 63. One or more additional spar elements, three such elements 64, 65 and 66 being shown, are adhesively attached to the trailing face of the spar. The trailing portion 67 is built up of blocks such as of balsa wood and a spline 68 embedded in the trailing portion and the element 66 to form a solid blade body. The film can be applied by the autoclave method or by applying a vacuum bag over the film with application of heat from a heating blanket or heating lamps.

An adhesive is applied to the surface of the blade and a film 71 of trifluorochloroethylene is folded around the trailing edge or tail portion of the blade so that the film covers both the upper and lower surfaces of the blade. This film extends into an abrasion strip recess 72. An abrasion cap or strip 73 passes over the leading edge or nose of the blade and so that the edge of the abrasion strip overlaps the film on both the upper and lower surfaces of the spar or blade, the adhesive is then cured. If the abrasion strip is plastic its edge which overlaps the film may be heat welded to the film. Instead of folding one sheet of film around the trailing edge of the blade, separate films may be applied to the upper and lower surfaces with one film having an extension which is folded around the trailing edge of the blade and along the other surface, as shown in FIGURE 7. The film placed on the other surface then overlaps the folded-over edge of the first film which overlap is heat-sealed or bonded together.

FIGURE 9 illustrates another form of blade which is made up in two half sections as previously described and as particularly illustrated resembles the blade of FIG. 3 in which the skins are continuous plies 76 extending over the spar and forming a part thereof. The two sections are then bonded together. This blade, however, does not include interior braces or stiffeners. The interior cavity is completely filled with closed cellular chemical foam 77. Hence vent holes are unncessary for pressure equalization and the cavity need not be moisture proofed. The spar plies 79 are built up as described for the other blades to an approximate midplane 81. A trailing edge portion or gluing strip 80 is also provided for each blade half or section. The blade sections are cooked as previously described. The blade halves are then routed and sanded as needed and particularly the mid-planes. A trailing edge tab 83 of Kel-F is bonded to one section at the trailing edge or may be bonded in place after the sections are bonded together. The cavity in each blade half is filled with the chemical foam. The slot for the balancing slug 82 is routed out and the slug inserted. The half sections are then bonded together in the manner described above.

With the blade sections bonded together, the outer surface is covered with a film 84 of trifluorochloroethylene of 5 to 10 mils thickness and having its bonding surface chemically treated as described. It is applied in any one of the manners previously described, however, a desirable method would be to fold the film around the leading edge of the blade and over the trailing edge tab. If desired that portion of the edges of the film which engages the upper and lower surfaces of the trailing edge tab 83 may be either not chemically treated or has the chemical treatment sanded from the surface. These overlying edges of the film are then heat-sealed to the trailing edge tab. The blade so constructed has the exterior surfaces moisture proofed which moisture proofs the whole blade. A leading edge abrasion strip 87 may be bonded around the leading edge of the blade.

The spar of FIGURE 9 is shown with a curved trailing face or edge 85 and a curve of semi-circular form is particularly desirable since this form greatly reduces stress concentrations. The trailing face or edges of the spars of the other blades described and illustrated herein may, and it is desirable that they be, of this shape or form.

Heat-sealing may be achieved by passing a heated iron of any suitable kind over the overlapping surfaces at a temperature which welds the overlap of the two films together and forms a moisture tight seal. The heat applied is about 500° Fahrenheit and it is applied for a few seconds.

The blades described are not only moisture proofed but their manufacture saves many hours of labor in that the outer surface is naturally smooth and hence need not be finished such as required for paint. Since a blade with a paint exterior coating of five layers or applications, requires that each coat be sanded smooth, the time saving is apparent. The film also can be easily repaired or patched in the event it is damaged and the patch heat-sealed in place to restore a moisture tight surface. At those points where the edges of two films on the inner cavity surfaces come together on assembly without overlap, the adhesive presses out to close any gaps between the adjacent edges of the film.

A suitable "cooking" adhesive for bonding the wood laminations together and for bonding other wood to wood elements or surfaces is a phenol-formaldehyde phenolic resin. An effective adhesive or glue for bonding the half blade sections together is resorcinol-phenol-formaldehyde resin with an accelerator and filler such as walnut shell flour. An epoxy resin is particularly suitable as a film adhesive because it does not contain a solvent which may cause bubbles during the cure. A phenol resin or rubber base adhesive may be used, however, time must be allowed for escape or evaporation of the solvent before curing to avoid the formation of bubbles.

This invention is presented to fill a need for improvements in a moisture proof helicopter blade. It is understood that various modifications in structure, as well as changes in mode of operation, assembly, and manner of use, may and often do occur to those skilled in the art, especially after benefiting from the teachings of the invention. This disclosure illustrates the preferred means of embodying the invention in useful form.

What is claimed is:

1. An aerodynamic portion of a helicopter blade comprising a laminated spar of moisture absorbing material and having an exterior upper surface and lower surface, a trailing portion attached to the spar of moisture absorbing material and having exterior surfaces, a thin film of trifluorochloroethylene of approximately 5 to 10 mils thickness having its inner surface a bonding surface, and the film being bonded to all exposed exterior surfaces of the spar and trailing portion with an adhesive.

2. An aerodynamic portion of a helicopter blade as in claim 1 including a projecting tab carried by the trailing edge and extending substantially beyond the moisture absorbing material and of trifluorochloroethylene and the film overlapping the tab and heat-sealed thereto.

3. An aerodynamic portion of a helicopter blade as in claim 1 in which the adhesive is an epoxy resin.

4. An aerodynamic portion of a helicopter blade as in claim 1 in which the spar has a trailing face, the trailing portion of the blade comprising an upper skin and a lower skin attached to the spar at the upper and lower surfaces of the spar and secured together at their trailing edges, the skins being spaced from each other forming an internal cavity having internal surfaces on skins and spar, and thin film of trifluorochloroethylene having a contacting bonding surface adhesively bonded to the inner skin and spar surfaces of the cavity.

5. An aerodynamic portion of a helicopter blade as in claim 4 including a plurality of spaced bracing means bonded directly to the spar and directly to the inner surface of at least one skin and extending from the spar to adjacent the trailing edge, the bracing means being of moisture absorbing material, and a film of trifluorochloroethylene having an inner bonding surface and extending over the exposed surfaces of the bracing means.

6. An aerodynamic portion of a helicopter blade as in claim 5 in which the upper skin in integral with outer layers of one surface of the spar, the lower skin is integral with the outer layers of the other surface of the spar, and the plurality of bracing means is a plurality of braces for each skin.

7. An aerodynamic portion of a helicopter blade as in claim 5 in which the spar has a trailing edge and each skin has a leading edge and a trailing edge including a recess at the trailing edge of the spar and in the upper and lower surface thereof, a gluing strip bonded to each skin at the leading edge thereof, a gluing strip bonded to each skin adjacent the trailing edge thereof and having a leading face, the leading edge gluing strip and the leading edge of each skin being bonded to the spar in a recess, the film of the inner surface of each skin extending over a portion of the leading edge gluing strip, the film on the trailing face of the spar overlapping the film on one of the leading edge gluing strips and sealed thereto, and the inner film on each skin extending over the leading face of its trailing edge gluing strip.

8. An aerodynamic portion of a helicopter blade as in claim 1 in which the film includes one film folded around the trailing edge of the trailing portion of the blade and over the surfaces of the trailing portion, and a second film folded around the leading edge of the spar with the edges overlapping the edges of first film, and the overlapping edges being heat-sealed together.

9. A method of making the aerodynamic portion of a helicopter blade comprising forming a blade including a spar of laminations of moisture absorbing material and a tail portion of moisture absorbing material attached to the spar, the spar and tail portion having exposed exterior surfaces, chemically treating a surface of a film of trifluorochloroethylene to provide an adhesion surface, applying a heat curing adhesive to all exposed exterior surfaces of the spar and tail portion, applying the film over all exposed exterior surfaces, and applying heat and pressure to the film with the heat being below the flow temperature of the film to secure a bond between the film and the surfaces.

10. A method of making the aerodynamic portion of a helicopter blade as in claim 9 in which the blade has a leading edge and a trailing edge including folding the film around one edge and over the top and bottom exterior surfaces of the blade with a portion overlapping at the other edge, the overlapping edges of the film lacking an adhesive surface, and heat-sealing the overlapping portions of the film together at a heat sealing temperature.

11. A method of making the aerodynamic portion of a helicopter blade as in claim 9 in which the spar has a leading edge and the trailing portion has a trailing edge and both have upper and lower surfaces in which the film is applied by folding a first film around the trailing edge and over the upper and lower surfaces of the trailing portion to the spar, folding a second film around the leading edge and over the upper and lower surfaces of the spar with its edges overlapping the edges of the first film, the contacting surfaces of the overlapping edges lacking chemical treatment, and heat-sealing the overlapping edges of the films to each other at a heat sealing temperature.

12. A method of making the aerodynamic portion of a helicopter blade as in claim 9 in which forming the blade includes forming two blade sections at a horizontal mid area of the blade and having an open cavity with inner surfaces, applying a heat curing adhesive to the inner surfaces, applying a film of trifluorochloroethylene on the inner surfaces, and assembling the sections together.

13. A method of making the aerodynamic portion of a helicopter blade as in claim 9 in which the blade is formed by forming two blade sections of approximately half a spar and half of a tail portion, each half of the tail portion including a skin secured to each spar half forming an open cavity having inner surfaces, applying a heat curing adhesive and a film of trifluorochloroethylene to the inner surfaces of the open cavity in each blade section, applying heat and pressure to bond the film to the surfaces, and then adhesively bonding the two blade sections together at the spar and at the trailing edge of the skins.

14. A method of making the aerodynamic portion of a helicopter blade comprising constructing a spar having a trailing face and outer surfaces, constructing a pair of skins having inner and outer surfaces, applying a heat curing adhesive to the inner and outer surfaces of the skin, applying a film of trifluorochloroethylene over the inner and outer surfaces of each skin, applying heat and pressure to the films to bond them to the surfaces, securing one skin to the spar, applying adhesive to the trailing face of the spar, applying a film of trifluorochloroethylene over the trailing face, applying heat and pressure to the film, securing the other skin to the spar and to the other skin at the trailing edge, applying adhesive to the outer surfaces of the spar, applying a film of trifluorochloroethylene to the outer surfaces of the spar with its edges overlapping the skins, and heat-sealing together each overlapping edge with the film on the outer surface of the skin.

15. A method of making the aerodynamic portion of a helicopter blade as in claim 14 including bonding a trailing edge tab of trifluorochloroethylene between the trailing edges of the skins and projecting from the trailing edge, the film on the outer surfaces of each skin at the trailing edge having extending edges which overlap the tab, and heat-sealing the overlapping edges of the film on each skin with the tab.

16. An aerodynamic portion of a helicopter blade comprising a laminated spar of moisture absorbing material and having an upper and lower surface, a trailing portion attached to the spar of moisture absorbing material, the spar and trailing portion including upper and lower half sections of the same or approximately the same size secured together, a thin film of trifluorochloroethylene having its inner surface a bonding surface, the film being bonded to all exposed exterior surfaces of the spar and trailing portion with an adhesive, the trailing portion of the blade comprising an upper and lower skin attached to the spar at the upper and lower surfaces of the spar and secured together at their trailing edges, the skins being spaced from each other forming an internal cavity having internal surfaces on spar and skins, and a thin film of trifluorochloroethylene adhesively bonded to the inner surfaces of the cavity.

17. An aerodynamic portion of a helicopter blade as in claim 16 including a trailing edge tab of trifluorochloroethylene secured to the trailing edge of the trailing portion and projecting therefrom, and the film and trailing edge tab being heat sealed together throughout the length of the tab.

References Cited in the file of this patent

UNITED STATES PATENTS

| | | |
|---|---|---|
| 1,838,674 | Heath | Dec. 29, 1931 |
| 1,848,018 | Maranville | Mar. 1, 1932 |
| 1,852,146 | Carns | Apr. 5, 1932 |
| 1,946,129 | Cebulski | Feb. 6, 1934 |
| 1,969,781 | Cierva | Aug. 14, 1934 |
| 2,020,759 | Atwood | Nov. 12, 1935 |
| 2,029,214 | Atwood | Jan. 28, 1936 |
| 2,035,588 | Bumpus | Mar. 31, 1936 |
| 2,175,204 | Lougheed | Oct. 10, 1939 |
| 2,208,619 | Armor | July 23, 1940 |
| 2,310,272 | Adlington | Feb. 9, 1943 |
| 2,400,649 | Larsen | May 21, 1946 |
| 2,400,918 | Cosler | May 28, 1946 |
| 2,450,440 | Mills | Oct. 5, 1948 |
| 2,450,455 | Synder | Oct. 5, 1948 |
| 2,467,031 | Hess | Apr. 12, 1949 |
| 2,470,056 | Seibel | May 10, 1949 |
| 2,477,113 | Campbell | July 26, 1949 |
| 2,482,375 | Sensenich | Sept. 20, 1949 |
| 2,484,141 | Alex | Oct. 11, 1949 |
| 2,581,454 | Sprung | Jan. 8, 1952 |
| 2,588,570 | Pitcairn | Mar. 11, 1952 |
| 2,589,786 | Engel | Mar. 18, 1952 |
| 2,637,405 | Stanley | May 5, 1953 |
| 2,809,130 | Rappaport | Oct. 8, 1957 |
| 2,941,603 | Jovanovich | June 21, 1960 |
| 2,952,320 | Bensen | Sept. 13, 1960 |

FOREIGN PATENTS

| | | |
|---|---|---|
| 578,168 | Great Britain | June 18, 1946 |